Figure 1:
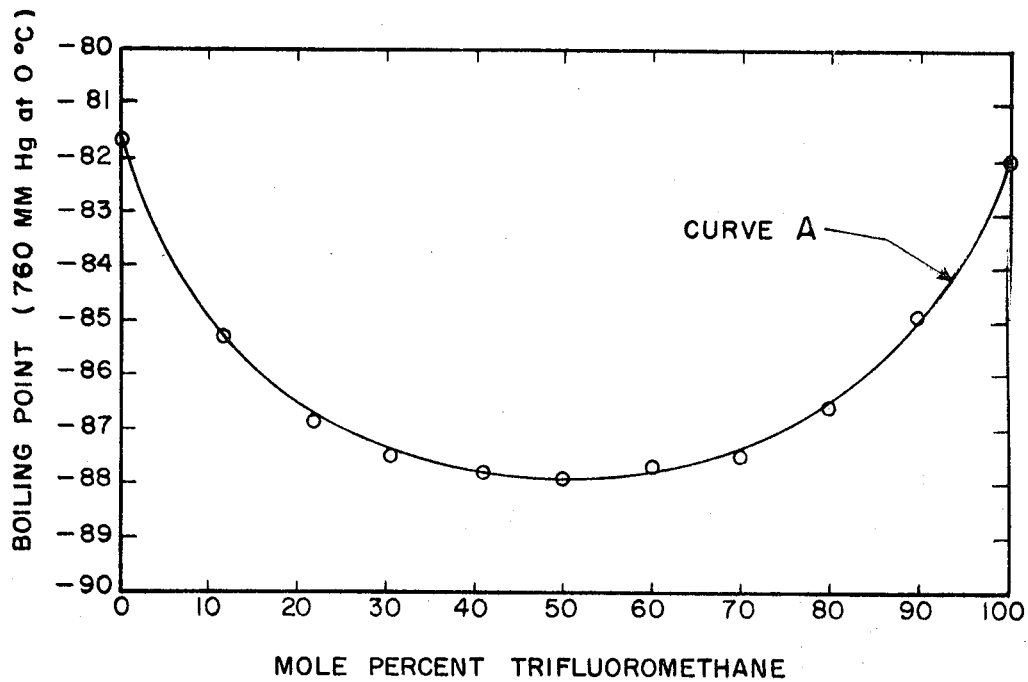

United States Patent
Orfeo et al.

[15] 3,640,869
[45] Feb. 8, 1972

[54] FLUOROCARBON COMPOSITIONS

[72] Inventors: Sabatino R. Orfeo, Morris Plains; Kevin P. Murphy, Bernardsville, both of N.J.

[73] Assignee: Allied Chemical Corporation, New York, N.Y.

[22] Filed: Sept. 18, 1964

[21] Appl. No.: 397,407

[52] U.S. Cl. ................................. 252/67, 252/305, 62/114
[51] Int. Cl. ........................................................ C09k 3/02
[58] Field of Search ................ 252/67, 78, 305; 62/113, 114; 260/653

[56] References Cited

UNITED STATES PATENTS

| | | | |
|---|---|---|---|
| 1,968,050 | 7/1934 | Midgley et al. | 252/67 |
| 668,609 | 3/1952 | Thomson-Houston | 252/67 |

*Primary Examiner*—John D. Welsh
*Attorney*—Irving N. Simmons

EXEMPLARY CLAIM

1. The process of producing refrigeration which comprises condensing a mixture consisting of trifluoromethane and monochlorotrifluoromethane, in which mixture the mole percent of trifluoromethane is in the range of about 20–75, and thereafter evaporating said mixture in the vicinity of a body to be cooled.

4 Claims, 2 Drawing Figures

INVENTORS
SABATINO R. ORFEO
KEVIN P. MURPHY
BY
ATTORNEY

FLUOROCARBON COMPOSITIONS

This invention relates to fluorinated hydrocarbons, and more particularly to constant boiling fluorochlorocarbon mixtures which comprise trifluoromethane and monochlorotrifluoromethane and which are especially adapted for use as high-capacity, low-temperature refrigeration compositions.

The refrigeration capacity of a given amount of refrigerant is largely a function of boiling point, the lower boiling refrigerants generally offering the greater capacity at a given evaporator temperature. This factor to a great extent influences the design of refrigeration equipment and affects capacity, power requirements, size and cost of the unit. Another important factor directly related to boiling point of the refrigerant is minimum cooling temperature obtained in the evaporator during the refrigeration cycle, a refrigerant boiling at least as low and lower than the desired refrigeration temperature being preferred. For these reasons a large number of refrigerants of different boiling temperatures and capacities are required to permit flexibility in design, and the art is presently faced with the problem of providing new refrigerants as the need arises for new capacities and types of installations.

The lower aliphatic hydrocarbons, when substituted by chlorine and fluorine, are known to have potential as refrigerants. Many of these chlorofluorohydrocarbons exhibit certain desired properties including low cost, low specific volume, low toxicity and chemical inertness which have resulted in the extensive use of such compounds in a large number of refrigeration applications. Examples of such compounds include difluorodichloromethane (b.p. −29.8° C.), chlorodifluoromethane (b.p. −40.8° C.), fluorodichloromethane (b.p. 8.9° C.), fluorotrichloromethane (b.p. 23.8° C.) and tetrafluorodichloroethane (b.p. 3.5° C.). While these chlorine-fluorine derivatives provide an adequate range of refrigerants for many purposes, only a very few boil sufficiently low to offer any potential as low-temperature refrigerants.

Increased activity in the field of low-temperature refrigeration gives rise to a need for new low-temperature refrigerants capable of operation over a wide range of temperatures. It is well known that mixtures of substances having different boiling points result in a range of mixture compositions having boiling points intermediate of the two components. On this basis it would be possible to mix two refrigerants having different boiling points and obtain a complete series of compositions boiling at temperatures between those of the components. However, it is known that such normal mixtures may exhibit fractionation. Mixture compositions which are more desirable for use in refrigeration are those which are azeotropic or constant boiling and hence do not exhibit substantial fractionation. Unfortunately, as is well known in this field, there has not yet been found by anyone a basis for the predictability of the formation of azeotropes between any two compounds and accordingly there is even less basis for predictability of a minimum boiling azeotrope having a boiling point below the boiling point of any of the components contained therein.

One commonly employed commercial method for producing low temperatures, say below about −40° F., is the so-called cascade refrigeration system in which a series of refrigerant liquids of progressively lower boiling points are condensed under pressure at the temperature produced by the evaporation of the next higher boiling refrigerant liquid. Because of its low boiling point and other desirable properties, such systems commonly use chlorotrifluoromethane (b.p. −81.4° C.) in the second of two stages. Trifluoromethane is a good substitute for chlorotrifluoromethane, having about the same boiling point (−82.0° C.), and is even superior in a number of characteristics. In order to reach temperatures below the range of these refrigerants, however, tetrafluoromethane (b.p. −128° C.), or equivalent, must be used and a third refrigeration stage added to the system. Ethane (b.p. −88.6° C.) has been used to fill the gap between the levels of the former refrigerants, having boiling points of about −82° C. and the latter refrigerant, having a boiling point of −128° C. Ethane, however, is highly flammable, which is highly undesirable for many refrigeration applications and accordingly there is a need for a substitute refrigerant composition having a boiling point about equivalent to that of ethane, which refrigerant does not suffer from the considerable disadvantage of being flammable.

Accordingly, it is a major object of the present invention to provide new compositions especially suitable for use as low-temperature refrigerants.

More particularly, it is an object to provide new refrigerants boiling lower and having greater capacity than the low boiling trifluoromethane.

Another object of the invention is to provide low boiling compositions comprising trifluoromethane and monochlorotrifluoromethane mixtures, which boil at substantially constant temperature and function as a single substance and therefore are usable in producing refrigeration, including those systems in which cooling is achieved by evaporation in the vicinity of the body to be cooled.

A further object is to provide nonflammable low boiling refrigerant compositions having boiling points about equivalent to that of ethane.

Yet another object of the invention is to provide an azeotropic refrigerant composition possessing many of the desirable refrigerant properties of ethane, such as refrigeration capacity, but possessing additional desirable characteristics, such as lower discharge temperatures, lower power requirements and nonflammability.

Another object of the invention is to provide a novel azeotropic composition boiling at temperatures lower than about −82° C., which composition is nonflammable and particularly suited for use in a cascade refrigeration type system.

In accordance with the invention it has been discovered that mixtures consisting of trifluoromethane and monochlorotrifluoromethane containing approximately 49–51 mole percent trifluoromethane form an azeotrope boiling at a temperature of about −87.9° C. at 14.65 p.s.i.a. Unless otherwise indicated, percentages indicated herein are in terms of mole percent. It has also been found that mixtures comprising trifluoromethane and monochlorotrifluoromethane substantially in the range of about 20 percent to about 75 percent trifluoromethane, having boiling points within about 1° C. of the azeotropic boiling point and exhibit only negligible fractionation on boiling under refrigeration conditions. $CHF_3/CClF$ compositions containing about 36 percent to about 64 percent trifluoromethane boil within 0.25° C. of the azeotrope. The composition of the invention, having boiling points of approximately −87° C. and below, represent a marked reduction as compared with the boiling temperature of the lower boiling trifluoromethane component (−82.0°). These compositions also provide substantially increased refrigeration capacity and represent new refrigerant compositions useful in obtaining high-capacity, low-temperature refrigeration. Moreover, the indicated azeotropic compositions exhibit a number of advantages over the use of either monochlorotrifluoromethane or trifluoromethane alone, as refrigerants; such as, for example, the azeotropic compositions permit lower temperatures to be reached than are obtainable with either of the components, the azeotropic compositions possess a lower compression ratio and exhibit a considerably higher capacity. Furthermore, the water solubility of the composition is higher than that of monochlorotrifluoromethane alone.

Boiling points of $CHF_3/CClF_3$ mixtures were determined using trifluoromethane better than 99.8 percent pure and commercial monochlorotrifluoromethane having a purity of 99 percent and better. The static method was used to measure the boiling points of the mixtures. Weighed amounts of the components were distilled into a steel bomb and thermostated at constant temperature to better than ±0.1° C. To minimize the segregation error, the system was always 50–80 percent liquid filled. Bath temperature was adjusted until the vapor pressure of the mixture was 1 atmosphere. All readings were corrected to normal atmospheric pressure of 760 mm. of Hg at 0° C. and standard gravity. The normal boiling point data are represented graphically by Curve A of FIG. 1 and are summarized in Table I.

TABLE I

Normal Boiling Points of $CHF_3/CClF_3$ Mixture System

| Mole % $CHF_3$ in solution | Normal Boiling Point, °C. |
|---|---|
| 0.0 | −81.7 |
| 11.9 | −85.3 |
| 22.4 | −86.9 |
| 31.1 | −87.5 |
| 41.9 | −87.8 |
| 50.0 | −87.9 |
| 60.0 | −87.7 |
| 69.8 | −87.5 |
| 79.8 | −86.6 |
| 90.5 | −84.9 |
| 100.0 | −82.0 |

Vapor pressures below 1 atmosphere were measured directly by a Wallace & Tiernan FA–135 mercury manometer connected to the steel bomb, which was accurate to better than 1 part in 1,000 and vapor pressures in excess of 1 atmosphere were read from a Bourdon Tube Pressure Gauge connected to said bomb. The bath temperature was controlled to better than 0.05° C. and was measured by an L & N platinum resistance thermometer which was calibrated against a NBS certified platinum resistance thermometer. The accuracy of the temperature measurements was 0.02° C.

Table II shows the temperature-pressure relationship for the $CHF_3/CClF_3$ azeotrope formed at about 50 mole percent of $CHF_3$.

TABLE II

VAPOR PRESSURE OF $CHF_3$–$CClF_3$ AZEOTROPE

| Temperature °C. | Pressure p.s.i.a. |
|---|---|
| −87.9 | 14.65 |
| −76.3 | 27.6 |
| −66.7 | 42.9 |
| −57.9 | 63.3 |
| −51.9 | 78.9 |
| −43.8 | 106.2 |
| −30.2 | 167.9 |
| −15.9 | 257.1 |
| −3.5 | 356.5 |
| 0.0 | 392.0 |

Figure 2:
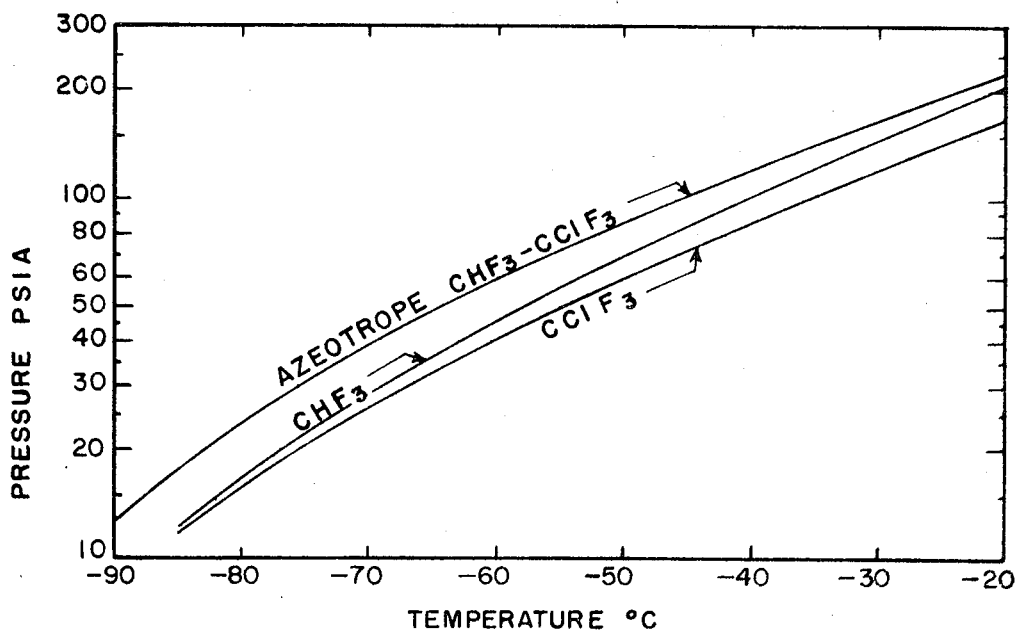

The curves in FIG. 2 of the drawing compare, graphically, the vapor pressure of the azeotrope to the vapor pressures of the $CHF_3$ and $CClF_3$ components. The vapor pressures (p.s.i.a.) are plotted as a function of temperature in °C. It will be noted that the vapor pressure of the azeotrope remains higher than the respective vapor pressures of the components over a wide range of temperatures, thus indicating that the system remains azeotropic or substantially constant boiling over this range.

The boiling point data demonstrate that compositions consisting of monochlorotrifluoromethane and about 49 mole percent to about 51 mole percent trifluoromethane form a minimum boiling azeotrope. The data further shows that compositions consisting of monochlorotrifluoromethane and about 20 mole percent to about 75 mole percent of trifluoromethane define a range of mixture compositions having boiling points which vary only slightly from that of the minimum boiling −87.9° C., 50 percent trifluoromethane compositions. As compositions containing about 20–75 mole % $CHF_3$ all boil between about −87° C. and −87.9° C., representing a maximum boiling temperature variation within 1° C., no significant fractionation occurs on distillation of any compositions within this range, and all such compositions are suited for use as refrigerants.

For most advantageous refrigerant use, it is desirable and preferred to employ mixtures substantially at about the 49–51% $CHF_3$ azeotrope compositions, if the objective is to avoid even minor differences in liquid and vapor composition. However, since there is no significant boiling point difference in the $CHF_3$ composition range of about 42–55 percent; for general first-class operation these compositions are preferred. In cases where operating requirements are less rigid, compositions in about the 36–64% $CHF_3$ range, all boiling at about, or below, minus 87.65° C. are preferred and are eminently suitable, since all such compositions boil within a variance of substantially 0.25° C.

Apart from use of the indicated amounts of trifluoromethane and monochlorotrifluoromethane, each of which is commercially available, makeup of the compositions of the invention requires no special procedures. The $CHF_3$ and $CClF_3$ employed should be substantially pure, preferably at least about 99 percent pure, and should contain no substances deleteriously affecting the boiling characteristics of the mixture compositions of their use as refrigerants.

EXAMPLE I

A sample of $CHF_3$ was refluxed in a low-temperature still at 14.65 p.s.i.a. and −82.0° C. About 10 weight percent of $CClF_3$ was added and the system refluxed. The reflux temperature dropped to −87.8° C., indicating the formation of a minimum boiling azeotrope.

EXAMPLE II

A sample of approximately equal moles of $CClF_3$ and $CHF_3$ were charged into a low-temperature still. The still has provisions for sampling from the pot and the resulting product was distilled and the −88° C. distillate collected. Analysis by gas chromatography showed 48 area % $CHF_3$ and 52 area % $CClF_3$. The azeotrope boiled at −87.9° C. at 14.65 p.s.i.a. and subsequent calibration of the chromatographs showed the azeotropic composition to consist of 50.0 ±1.0 mole % $CHF_3$. A sample of this material was sealed in a heavy-wall glass tube. The critical temperature, which was measured by the appearance and disappearance of the miniscus, was 19.5° C.

EXAMPLE III

Monochlorotrifluoromethane is used to produce refrigeration in a system wherein the evaporating temperature is −100° F. and the condensing level is −30° F. The corresponding compression ratio is 4.75. This results in a volumetric (or pumping) efficiency of about 72 percent and means that for a ton of useful refrigeration, 6.74 cubic feet per minute of monochlorotrifluoromethane has to be pumped. In order to accomplish this, a compressor possessing a piston displacement of 9.35 cubic feet per minute is required.

EXAMPLE IV

In the above system, at the same working temperatures, trifluoromethane is substituted as refrigerant. The compression ratio is now 5.32, which corresponds to a volumetric efficiency of about 68.6 percent. For one ton of useful refrigeration, a compressor 7.75 cubic feet per minute piston displacement is required. If the compressor utilized with the monochlorotrifluoromethane refrigerant of Example III is employed, using trifluoromethane as the refrigerant, 1.21 tons of useful refrigeration will be produced. This is to be compared against the one ton of useful refrigeration obtained with this compressor, using monochlorotrifluoromethane as refrigerant.

EXAMPLE V

A 50 mole percent azeotropic mixture of trifluoromethane and monochlorotrifluoromethane is substituted as refrigerant in a system with the same working temperatures employed in above Examples III and IV. The compression ratio now is 4.57, corresponding to a volumetric efficiency of about 73 percent. For one ton of useful refrigeration, only 4.85 cubic feet per minute of refrigerant gas flow is required and a compressor to accomplish this end need only have a piston displacement of 6.65 cubic feet per minute. Thus, for a one ton capacity, a smaller compressor than that needed in either Example III or IV is required. If the compressor utilized in Example III or IV were employed, the azeotrope refrigerant would produce about 1.41 tons of refrigeration. The azeotrope, when utilized as refrigerant, then offers a capacity advantage of 41 percent over monochlorotrifluoromethane and 17 percent over trifluoromethane, when these substances are used as refrigerants. This capacity advantage can be utilized either for obtaining greater capacity from an existing unit, or for constructing smaller units capable of handling the same refrigeration requirements.

The low compression ratio obtained with the trifluoromethane/monochlorotrifluoromethane azeotrope, is significant in another respect, insofar as low-temperature refrigerating applications are concerned. The low compression ratio makes it possible to reach lower temperatures than would be obtainable using either trifluoromethane or monochlorotrifluoromethane alone. The ultimate limitation on evaporator temperature can be said, for all practical purposes, to be limited by the compression ratio. As compression ratios increase, volumetric efficiencies fall off rapidly and operating problems multiply. Standard compressors are restricted to compression ratios of about 10 to 1, or less. In a cascade type system, such as would be used with the trifluoromethane/monochlorotrifluoromethane composition mixtures of the invention, the condensing temperature can be brought down to about −30° F. by the high stage unit. A 10 to 1 compression ratio limit on the low-stage unit would then fix the lowest temperature attainable with the system at −124° F. for monochlorotrifluoromethane and at −120° F. for trifluoromethane. By use of the trifluoromethane/monochlorotrifluoromethane azeotrope, a temperature of −128° F. is attainable. It should be pointed out that the above-described improvements in capacity and compression ratios become even more pronounced at lower evaporator temperatures.

By way of summary, the compositions of the present invention exhibit the desired refrigerant properties including low cost, low specific volume, nontoxicity, nonflammability and chemical inertness. The mixtures indicated boil at a temperature substantially lower than trifluoromethane and monochlorotrifluoromethane and therefore represent new refrigerants offering lower refrigeration temperatures than either of these components. The essentially constant boiling properties of mixtures containing between about 20 to about 75 percent trifluoromethane provide a substantial range of compositions suitable for use in the many types of refrigeration in which cooling is effected by condensing and thereafter evaporating the refrigerant in the vicinity of a body to be cooled. As refrigerants these compositions are particularly useful in the special situation known in the art to provide additional capacity where needed in equipment designed for cascade type cooling. It will further be noted that the mixture systems disclosed herein may also be used for other purposes, including use as heat transfer media and as low-temperature solvents.

We claim:

1. The process of producing refrigeration which comprises condensing a mixture consisting of trifluoromethane and monochlorotrifluoromethane, in which mixture the mole percent of trifluoromethane is in the range of about 20–75, and thereafter evaporating said mixture in the vicinity of a body to be cooled.

2. The process of producing refrigeration which comprises condensing a mixture consisting of trifluoromethane and monochlorotrifluoromethane, in which mixture the mole percent of trifluoromethane is in the range of about 36–64, and thereafter evaporating said mixture in the vicinity of a body to be cooled.

3. The process of producing refrigeration which comprises condensing a mixture consisting of trifluoromethane and monochlorotrifluoromethane, in which mixture the mole percent of trifluoromethane is in the range of about 42–55, and thereafter evaporating said mixture in the vicinity of a body to be cooled.

4. The process of producing refrigeration which comprises condensing a mixture consisting of trifluoromethane and monochlorotrifluoromethane, in which mixture the mole percent of trifluoromethane is in the range of about 49–51, and thereafter evaporating said mixture in the vicinity of a body to be cooled.

* * * * *